Patented Mar. 1, 1949

2,463,462

UNITED STATES PATENT OFFICE 2,463,462

HYDROXY AMIDES OF DIHYDROXY BENZOIC ACID

John L. Huck, Jr., Nutley, N. J., assignor to Hoffmann-La Roche Inc., Nutley, N. J., a corporation of New Jersey No Drawing. Application January 31, 1948, Serial No. 5,683

4 Claims. (Cl. 260—559)

1

The present invention relates to aliphatic hydroxy amides of gentisic acid and to their method of production. The new compounds may be represented by the following formula:

(A) 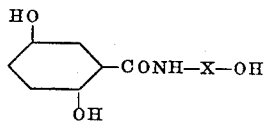

In the above formula X stands for a divalent aliphatic radical which contains at least two carbon atoms, the two valences in the aliphatic radical being attached to different carbon atoms. The aliphatic radical may carry various substituents such as, for example, chlorine and bromine.

The new compounds possess antibacterial properties. They can also be employed as intermediates for preparing other compounds.

In general the compounds of Formula A can be prepared by reacting an ester of gentisic acid which can be represented by the following formula:

(B) 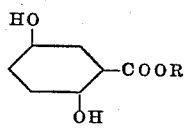

with an aliphatic hydroxy amine of the following general formula:

(C) $\quad NH_2-X-OH$

The reaction can be represented by the following equation:

(D) 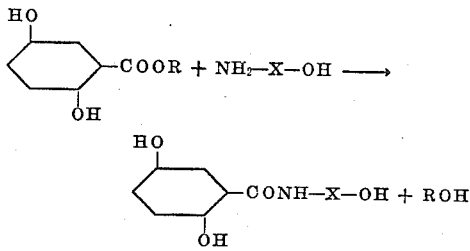

In Formulae B and D, R stands for an alkyl radical such as, for example, methyl, ethyl, propyl and the like, and X in Formulae C and D has the same significance as described for Formula A.

In general, the temperature employed in the reaction may vary over a wide range as, for example, from about 50° C. to about 180° C. Temperatures of about 100° C. to about 130° C. are preferably employed. The reaction can readily be carried out on a steam bath. The process can be carried out in the presence or absence of a

2 solvent. An inert diluent as, for example, benzene, toluene, and the like can be employed. Since the esters of gentisic acid are relatively unstable, being oxidized by air in alkaline media, it is preferred to carry out the reaction in an inert atmosphere as, for example, in the presence of nitrogen or carbon dioxide.

The amounts of the reagents employed may be widely varied. However, it has been found advantageous to employ the hydroxy aliphatic amine in excess, since maximum yields of the lower aliphatic hydroxy amides of gentisic acid are obtained. If less of the hydroxy aliphatic amine is employed as, for example, in a ratio of 1:1, the yields are somewhat lower. Excess of the amine can be recovered after the reaction is completed by distilling it off from the reaction mixture under vacuum.

The following examples will serve to illustrate the invention:

Example 1

N-(β-hydroxyethyl)-gentisamide

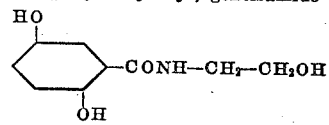

168 grams (1 mol) of methylgentisate are stirred into 200 cc. of benzene, 244 grams (4 mols) of monoethanolamine are added and heated under stirring to 75–80° C. in a nitrogen atmosphere. The benzol and the methanol formed are distilled off at the same time. The residue is now heated in a vacuum in order to distill off the excess of ethanolamine at a bath temperature not substantially exceeding 180° C. (preferably at 150° C.). The residue is acidified with hydrochloric acid and allowed to cool for crystallization. The crystals are sucked off and washed with a small amount of ice cold water. They can, if necessary, be recrystallized from water. The N-(β-hydroxyethyl)-gentisamide forms white prisms. The compound melts at 145–148° C.

Example 2

168 grams of methylgentisate are heated with 92.5 grams (1.5 mol) of ethanolamine in a vacuum at a bath temperature of 110–130° C. for one hour. The resulting solution is acidified and the product allowed to crystallize. The same product as in Example 1 is obtained.

Example 3

182 grams of ethylgentisate are reacted with 92.5 grams of ethanolamine in the manner described in Example 2. The product obtained is the same as in Example 1.

*Example 4*

N-(β-hydroxypropyl)-gentisamide

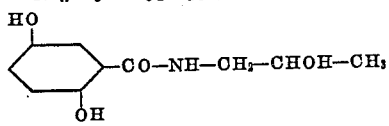

168 grams (1 mol) of methylgentisate, 300 grams (4 mols) of 1-aminopropanol-2 are reacted as described in Example 1. The product can be recrystallized from water and forms white prisms of M. P. 141–142°.

*Example 5*

N-(1,1-dimethyl-2-hydroxyethyl)-gentisamide

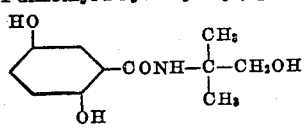

168 grams (1 mol) of methylgentisate are heated with 115 grams of 1,1-dimethyl-2-hydroxyethylamine in a vacuum to 100–110° C. for two hours. The residue is dissolved in hot water and the solution acidified with hydrochloric acid. When allowed to cool, the reaction product crystallizes in white crystals with a melting point of 179–180° C.

*Example 6*

N-(β,β′,β″-trihydroxy-tertiary-butyl)-gentisamide

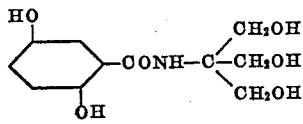

168 grams (1 mol) of methylgentisate are mixed with 181.5 grams of β,β′,β″-trihydroxy-tertiary-butylamine and the mixture kept at 130° C. in a nitrogen atmosphere for three hours. The melt is dissolved in hot water and the solution allowed to cool. White crystals are obtained melting at 191–192° C.

The above examples, it will be understood, are given by way of illustration. Those skilled in the art will recognize that other alkyl esters of gentisic acid may be reacted with other hydroxy aliphatic amines to form other aliphatic hydroxy amides of gentisic acid which come within the scope of the invention.

I claim:
1. A lower alkylolamide of gentisic acid.
2. N-(β-hydroxyethyl)-gentisamide.
3. N-(β-hydroxypropyl)-gentisamide.
4. N-(1,1-dimethyl-β-hydroxyethyl)-gentisamide.

JOHN L. HUCK, Jr.

REFERENCES CITED

The following references are of record in the file of this patent:

UNITED STATES PATENTS

| Number | Name | Date |
|---|---|---|
| 1,675,500 | Kropp | July 3, 1928 |
| 1,990,453 | Hund et al. | Feb. 5, 1935 |